(12) United States Patent
Doshi et al.

(10) Patent No.: US 11,974,138 B2
(45) Date of Patent: Apr. 30, 2024

(54) MULTI-STAGE MARKOV DECISION PROCESS (MDP) MODEL FOR A SPECTRUM SHARING SYSTEM

(71) Applicant: QUALCOMM Incorporated, San Diego, CA (US)

(72) Inventors: Akash Sandeep Doshi, Austin, TX (US); Srinivas Yerramalli, San Diego, CA (US); Lorenzo Ferrari, Oakland, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 17/478,669

(22) Filed: Sep. 17, 2021

(65) Prior Publication Data

US 2022/0095119 A1     Mar. 24, 2022

Related U.S. Application Data

(60) Provisional application No. 63/080,962, filed on Sep. 21, 2020.

(51) Int. Cl.
*H04W 16/14*     (2009.01)
*G06N 3/08*     (2023.01)
*H04W 24/08*     (2009.01)

(52) U.S. Cl.
CPC ............ *H04W 16/14* (2013.01); *G06N 3/08* (2013.01); *H04W 24/08* (2013.01)

(58) Field of Classification Search
CPC ..... H04W 16/14; H04W 24/08; H04W 88/08; G06N 3/08; G06N 3/045; G06N 7/01; G06N 3/006; G06N 20/00; G06N 3/088; G06F 18/214; H04L 41/16
See application file for complete search history.

(56) References Cited

U.S. PATENT DOCUMENTS 10,164,840 B2 * 12/2018 Jang .................... H04W 16/14
10,405,191 B2 *  9/2019 Mushunuri ......... H04W 74/085
11,601,146 B2 *  3/2023 Luo ............................ H03F 3/24
(Continued)

*Primary Examiner* — Brian T O Connor
(74) *Attorney, Agent, or Firm* — QUALCOMM Incorporated

(57) ABSTRACT

A method of wireless communication performed by a first transmission device incudes receiving a first set of observations from a first receiving device based on transmissions from the first transmission device to the first receiving device at a previous time slot of a fixed contention-based spectrum sharing system. The first transmission device shares a spectrum with a second transmission device. The method also includes measuring an energy level from an ongoing data transmission of the second transmission device at a current time slot. The method further includes generating, at an artificial neural network of the first transmission device, at least one of a transmission determination, a set of transmission parameters, or a combination thereof, based on a second set of observations, the energy level, and a counter. The method also includes transmitting, to the first receiving device, during the current time slot based on at least one of the transmission determination, the set of transmission parameters, or the combination thereof.

40 Claims, 11 Drawing Sheets

(56) References Cited

U.S. PATENT DOCUMENTS

| | | | |
|---|---|---|---|
| 11,696,155 B2* | 7/2023 | Cioffi | H04W 28/16 |
| | | | 455/446 |
| 11,711,284 B2* | 7/2023 | Svennebring | H04L 43/0882 |
| | | | 370/252 |
| 2019/0319868 A1* | 10/2019 | Svennebring | H04L 41/147 |
| 2022/0038359 A1* | 2/2022 | Svennebring | H04L 43/0882 |
| 2022/0052885 A1* | 2/2022 | Luo | G06N 3/063 |
| 2023/0079385 A1* | 3/2023 | Luo | H04L 25/0254 |

\* cited by examiner

MULTI-STAGE MARKOV DECISION PROCESS (MDP) MODEL FOR A SPECTRUM SHARING SYSTEM

CROSS-REFERENCE TO RELATED APPLICATION

The present application claims the benefit of U.S. Provisional Patent Application No. 63/080,962, filed on Sep. 21, 2020, and titled "MULTI-STAGE MARKOV DECISION PROCESS (MDP) MODEL FOR A SPECTRUM SHARING SYSTEM," the disclosure of which is expressly incorporated by reference in its entirety.

FIELD OF THE DISCLOSURE

Aspects of the present disclosure generally relate to wireless communications, and more particularly to techniques and apparatuses for a multi-stage Markov decision process (MDP) model for a spectrum sharing system.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (FORM) with a cyclic prefix (CP) (CP-FORM) on the downlink (DL), using CP-FORM and/or SC-FDM (e.g., also known as discrete Fourier transform spread FORM (DFT-s-FORM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

In one aspect of the present disclosure, a method for wireless communication by a first transmission device is disclosed. The method includes receiving a first set of observations from a first receiving device based on transmissions from the first transmission device to the first receiving device at a previous time slot of a fixed contention-based spectrum sharing system. The first transmission device shares a spectrum with a second transmission device. The method also includes measuring an energy level from an ongoing data transmission of the second transmission device at a current time slot. The method further includes generating, at an artificial neural network of the first transmission device, at least one of a transmission determination, a set of transmission parameters, or a combination thereof, based on a second set of observations, the energy level, and a counter. The method still further includes transmitting, to the first receiving device, during the current time slot based on at least one of the transmission determination, the set of transmission parameters, or the combination thereof.

Another aspect of the present disclosure is directed to an apparatus for wireless communication at a first transmission device. The apparatus includes means for receiving a first set of observations from a first receiving device based on transmissions from the first transmission device to the first receiving device at a previous time slot of a fixed contention-based spectrum sharing system. The first transmission device shares a spectrum with a second transmission device. The apparatus also includes means for measuring an energy level from an ongoing data transmission of the second transmission device at a current time slot. The apparatus further includes means for generating, at an artificial neural network of the first transmission device, at least one of a transmission determination, a set of transmission parameters, or a combination thereof, based on a second set of observations, the energy level, and a counter. The apparatus still further includes means for transmitting, to the first receiving device, during the current time slot based on at least one of the transmission determination, the set of transmission parameters, or the combination thereof.

In another aspect of the present disclosure, a non-transitory computer-readable medium with non-transitory program code recorded thereon is disclosed. The program code is for wireless communication at a first transmission device. The program code is executed by a processor and includes program code to receive a first set of observations from a first receiving device based on transmissions from the first transmission device to the first receiving device at a previous time slot of a fixed contention-based spectrum sharing system. The first transmission device shares a spectrum with a second transmission device. The program code also includes program code to measure an energy level from an ongoing data transmission of the second transmission device at a current time slot. The program code further includes program code to generate, at an artificial neural network of the first transmission device, at least one of a transmission determination, a set of transmission parameters, or a combination thereof, based on a second set of observations, the energy level, and a counter. The program code still further includes program code to transmit, to the first receiving device, during the current time slot based on at least one of the transmission determination, the set of transmission parameters, or the combination thereof.

Another aspect of the present disclosure is directed to a first transmission for wireless communication. The apparatus having a memory, one or more processors coupled to the memory, and instructions stored in the memory. The instructions being operable, when executed by the processor, to cause the apparatus to receive a first set of observations from a first receiving device based on transmissions from the first transmission device to the first receiving device at a previous time slot of a fixed contention-based spectrum sharing system. The first transmission device shares a spectrum with a second transmission device. The instructions also cause the apparatus to measure an energy level from an ongoing data transmission of the second transmission device at a current time slot. The instructions additionally cause the apparatus to generate, at an artificial neural network of the first transmission device, at least one of a transmission determination, a set of transmission parameters, or a combination thereof, based on a second set of observations, the energy level, and a counter. The instructions further cause the apparatus to transmit, to the first receiving device, during the current time slot based on at least one of the transmission determination, the set of transmission parameters, or the combination thereof.

Another aspect of the present disclosure is directed to a first transmission device. The first transmission device having a memory, one or more processors coupled to the memory, and instructions stored in the memory. The instructions being operable, when executed by the processor, to cause the first transmission device to receive a first set of observations from a first receiving device. The first set of observations are based on transmissions from the first transmission device to the first receiving device at a previous time slot of a fixed contention-based spectrum sharing system. The first transmission device shares a spectrum with a second transmission device. The instructions also cause the apparatus to measure an energy level from an ongoing data transmission of the second transmission device at a current time slot. The instructions additionally cause the apparatus to generate, at an artificial neural network of the first transmission device, a transmission determination, and/or a set of transmission parameters. The transmission determination and/or a set of transmission parameters are based on a second set of observations, the energy level, and a counter. The instructions further cause the apparatus to transmit, to the first receiving device, during the current time slot based on transmission determination and/or a set of transmission parameters.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
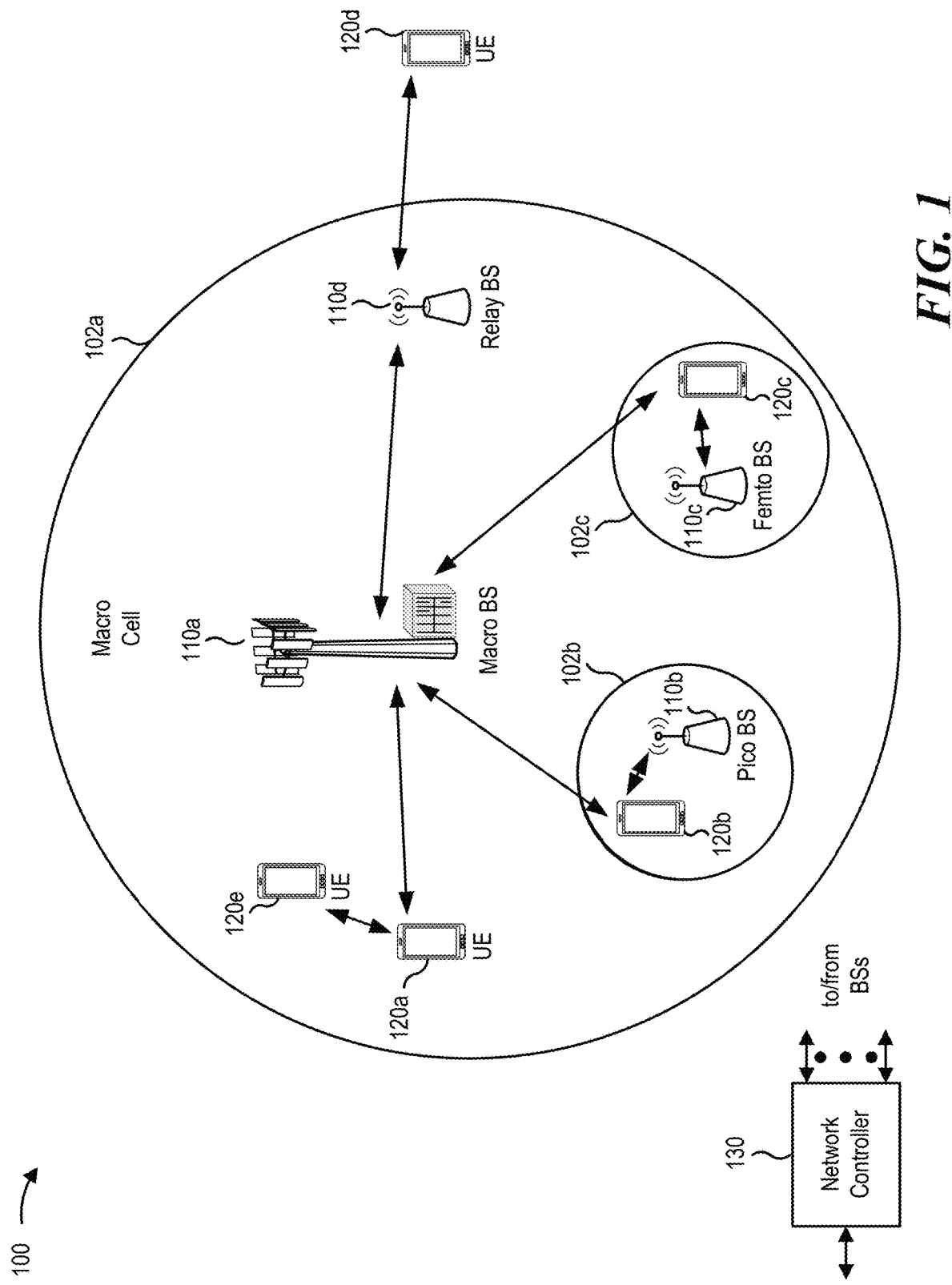
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Spectrum sharing for communication systems, such as long-term evolution (LTE), new radio-unlicensed (NR-U), and Wi-Fi, may include one or more of a sensing operation, a receiver confirmation operation, and a transmit operation. For ease of explanation, the current disclosure will discuss NR-U spectrum sharing. In most scenarios, the sensing operation determines whether a transmission device, such as a base station, should initiate a transmission. The sensing operation may be performed during a contention window (CW). Before transmitting, the transmission device may (randomly) select a countdown number based on a size of the contention window. For example, if the contention window size is fifteen, the transmission device may randomly select any number between one and fifteen, or zero and fourteen, as the countdown number, where the selected countdown number corresponds to a wait time before the transmission to a receiving device, such as a user equipment (UE). Each counter number within the contention window size may correspond to a transmission time. The transmission device senses a medium (e.g., the medium corresponding to the time slot) for a specific waveform signature. Additionally, or alternatively, the transmission device senses the medium to determine if energy detected in the medium is greater than a threshold. If the medium is clear, the transmission device waits until the selected countdown number is counted down to zero (e.g., decremented from the countdown number to zero) before the transmission occurs.

It may be desirable to improve transmitter sensing to reduce, or eliminate, reliance on receiver feedback. Aspects of the present disclosure are directed to a deep neural network reinforcement learning approach that uses receiver link quality information to improve transmitter sensing. The sensing may be performed for different types of wireless communication, such as downlink communication, uplink communication, or sidelink communication.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a TRP, and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
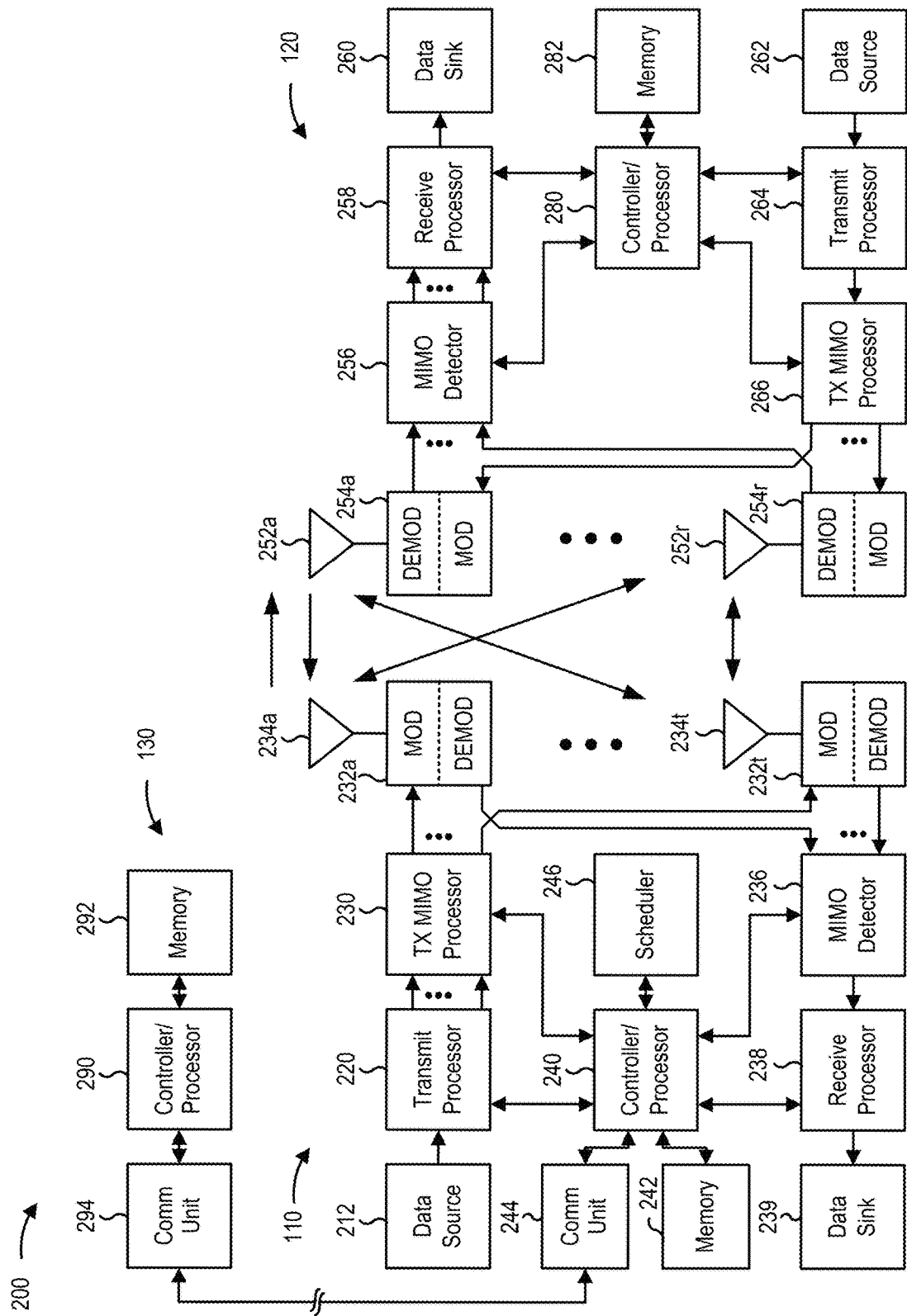
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for FORM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, down-convert, and digitize) a received signal to obtain input samples. Each demodulator 254 may further process the input samples (e.g., for FORM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/ processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for DFT-s-FORM, CP-FORM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with reinforcement learning for spectrum sharing as described in more detail elsewhere. For example, the controller/processor 240 of the base station 110, the controller/processor 280 of the UE 120, and/or any other component(s) of FIG. 2 may perform or direct operations of, for example, the process of FIG. 10 and/or other processes as described. Memories 242 and 282 may store data and program codes for the base station 110 and UE 120, respectively. A scheduler 246 may schedule UEs for data transmission on the downlink and/or uplink.

In some aspects, the transmission device, such as a UE 120 or a base station 110, may include means for receiving a first set of observations from a first receiving device; means for measuring an energy level from an ongoing data transmission of the second transmission device at a current time slot; means for generating, at an artificial neural network of the first transmission device, a transmission determination and/or a set of transmission parameters; and means for transmitting, to the first receiving device, during the current time slot based on transmission determination and/or a set of transmission parameters. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
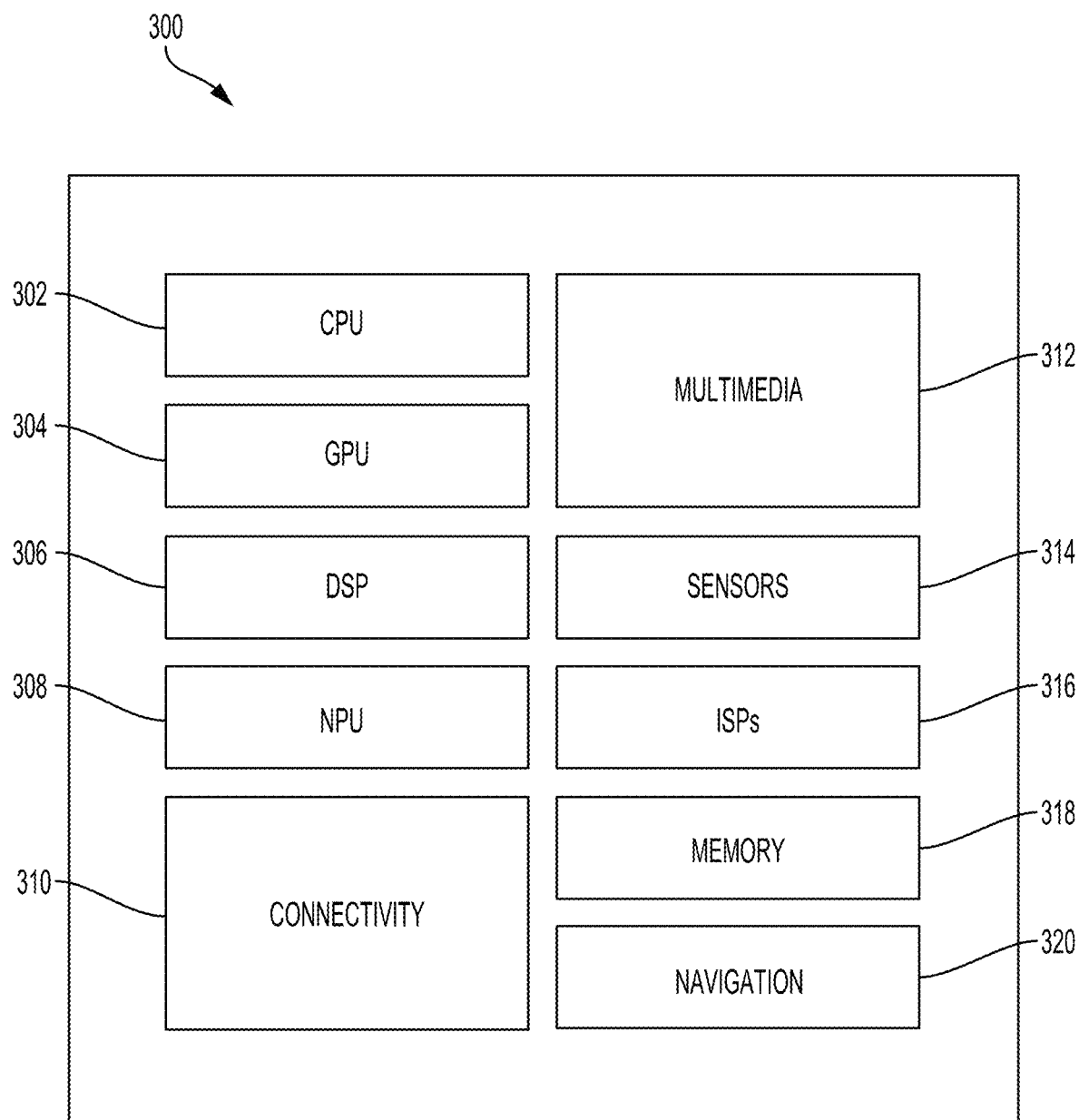
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to receive a first set of observations from a first receiving device; code to measure an energy level from an ongoing data transmission of the second transmission device at a current time slot; code to generate, at an artificial neural network of the first transmission device, a transmission determination and/or a set of transmission parameters; and code to transmit, to the first receiving device, during the current time slot based on transmission determination and/or a set of transmission parameters.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
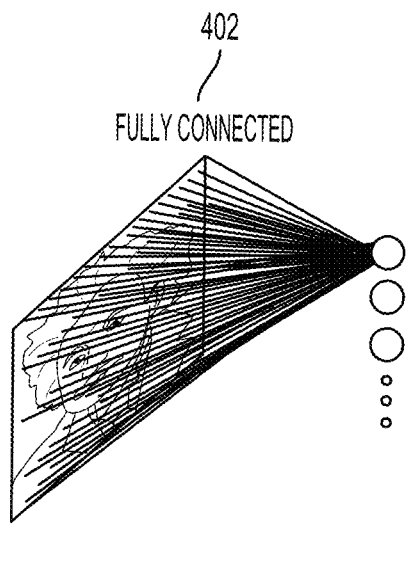
FIGS. 4A, 4B, and 4C are diagrams illustrating a neural network, in accordance with aspects of the present disclosure.
Figure 4B:
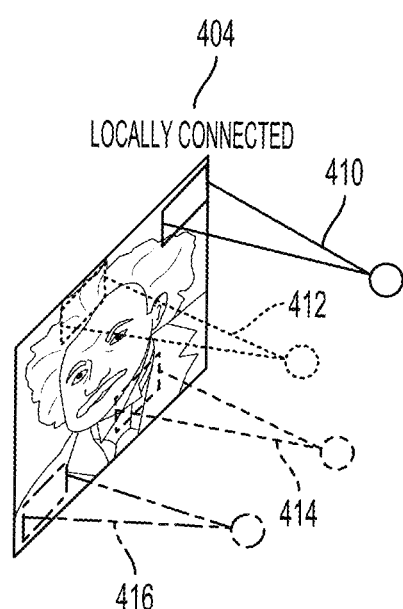

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
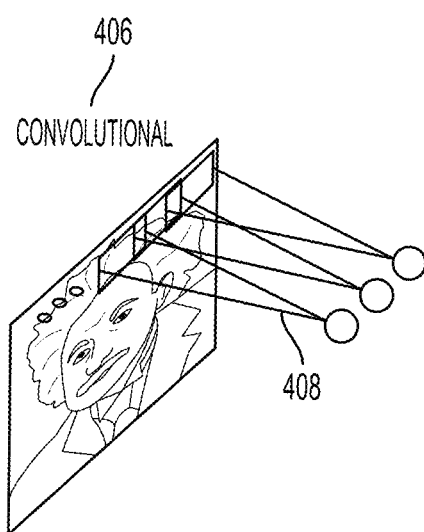

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
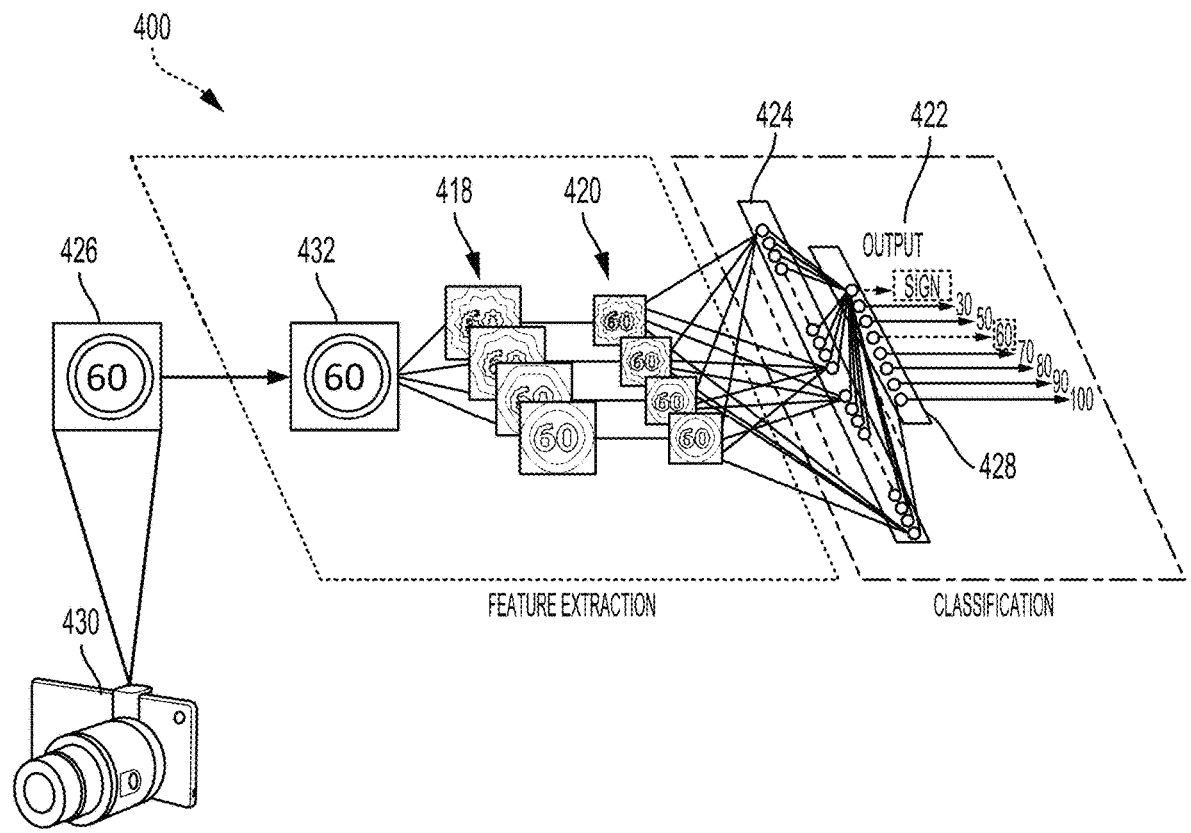
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
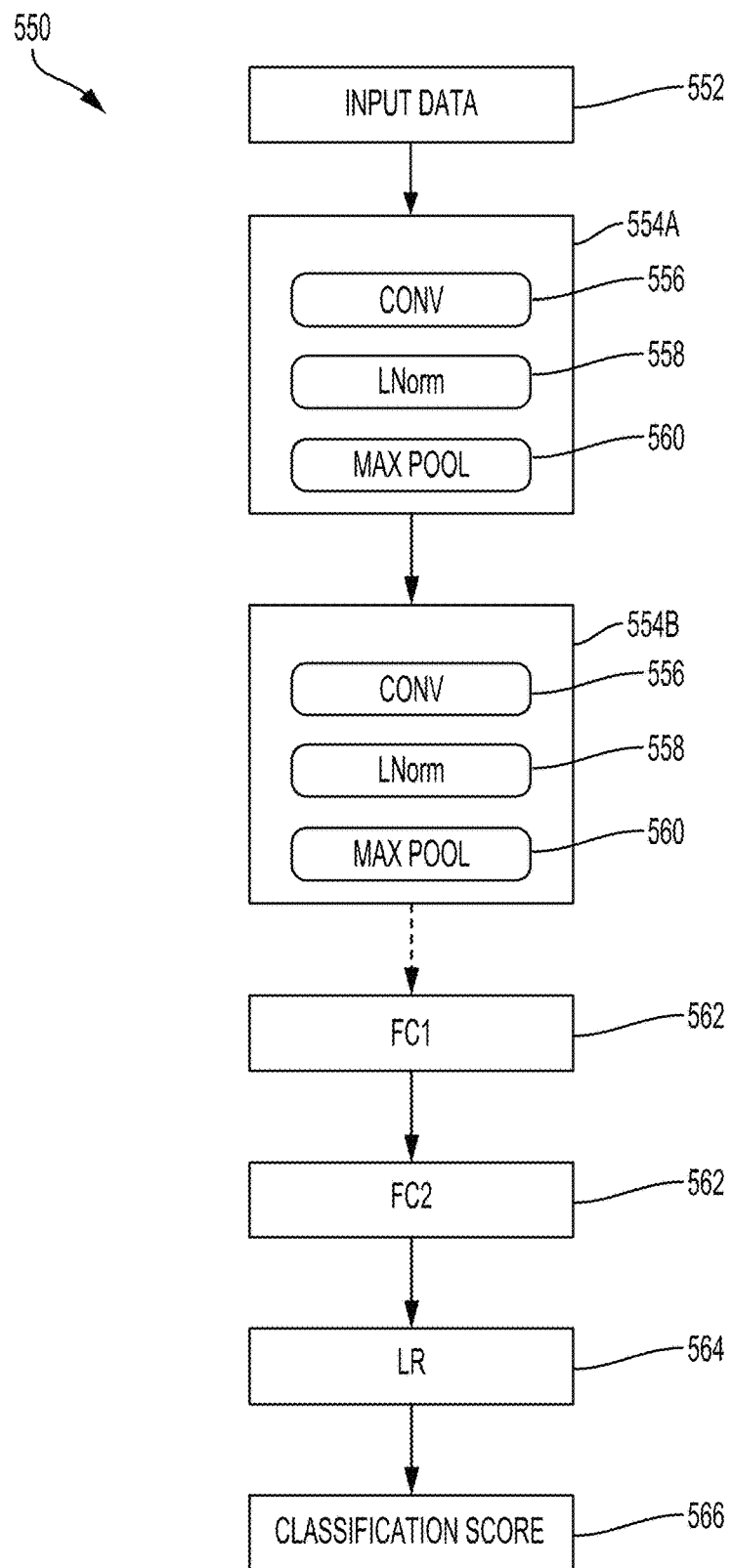
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

As described, various operations may be performed when a communication system, such as long-term evolution (LTE), new radio-unlicensed (NR-U), and Wi-Fi, shares at least a portion of its spectrum with another communication system. These operations may include one or more of a sensing operation, a receiver confirmation operation, and a transmit operation. For ease of explanation, the current disclosure will discuss NR-U spectrum sharing.

NR-U devices may adhere to listen-before-talk (LBT) specifications when accessing a channel. Network access in an unlicensed spectrum may be referred to as licensed-assisted access (LAA). An LBT LAA device may perform a clear channel assessment (CCA) check using detected energy, where the channel is considered clear only if the energy level in the channel is less than a CCA threshold for a duration of an observation time. If the channel is deemed clear, the device may transmit data for a period equal to a channel occupancy time (COT) before repeating the clear channel assessment procedure.

LBT schemes may be specified for frame-based equipment (FBE) and load-based equipment (LBE). In FBE, channel sensing may be performed at fixed time instances. In this example, if a channel is busy, the licensed-assisted access base station may back off for a fixed time period, and also sense the channel again after the fixed time period. In LBE, the channel sensing is performed at any time instance, and a random back-off may be specified if the channel is busy. Aspects of the present disclosure are not limited to a particular system. For example, aspects of the present disclosure may be implemented in an FBE or a non-synchronized LBE.

Figure 6:
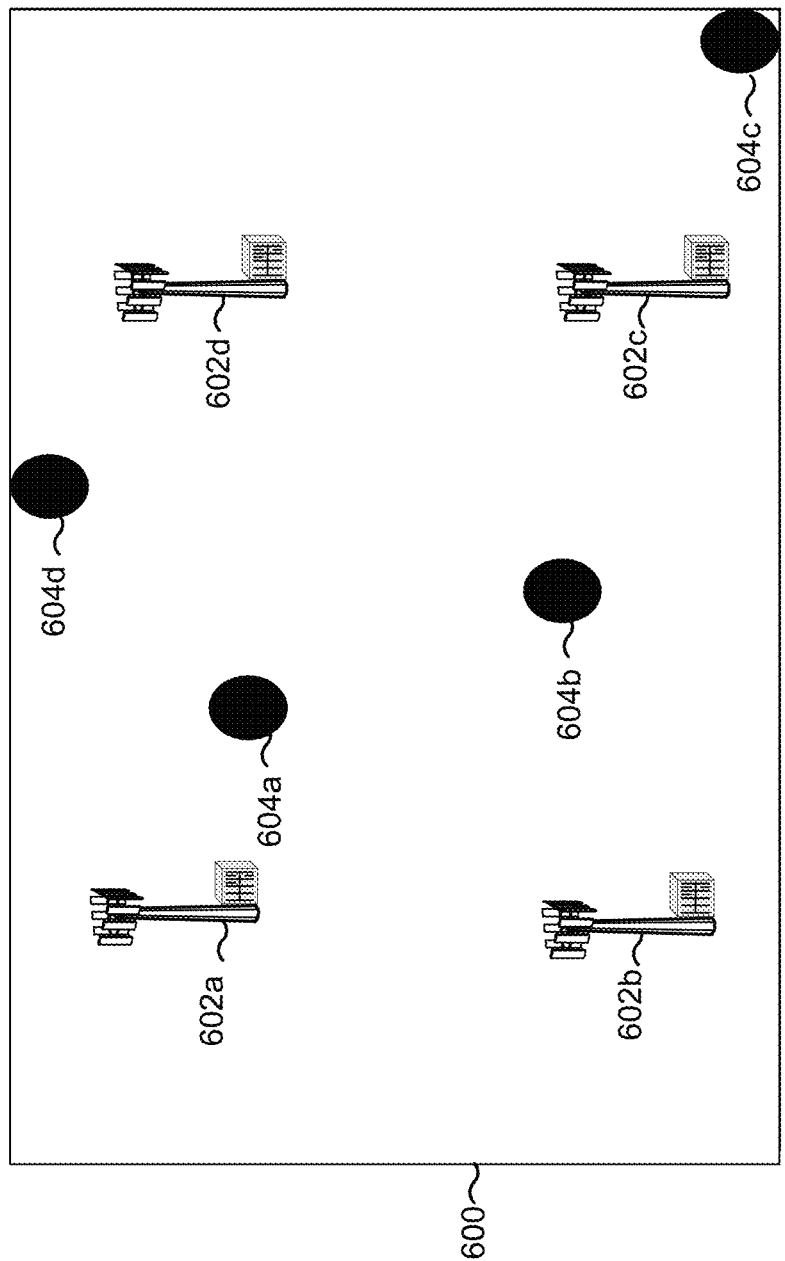
FIG. 6 is a block diagram illustrating an example of a layout for a fixed deployment, in accordance with aspects of the present disclosure.

Some aspects of the present disclosure may be directed to a fixed deployment for transmission devices, such as base stations, associated with a single operator. FIG. 6 is a block diagram illustrating an example of a layout 600 for a fixed deployment, in accordance with aspects of the present disclosure. In the example of FIG. 6, multiple transmission devices 602a, 602b, 602c, 602d are deployed in an environment where each transmission device 602a, 602b, 602c, 602d is associated with a single operator. In the current example, each transmission device 602a, 602b, 602c, 602d serves a different receiving device 604a, 604b, 604c, 604d. Aspects of the present disclosure are not limited to each transmission device 602a, 602b, 602c, 602d serving one receiving device 604a, 604b, 604c, 604d. In some aspects, each transmission device 602a, 602b, 602c, 602d may serve multiple receiving devices. In one configuration, the transmission devices 602a, 602b, 602c, 602d are examples of base stations 110 described with reference to FIGS. 1 and 2, and the receiving devices 604a, 604b, 604c, 604d are examples of UEs 120 described with reference to FIGS. 1 and 2.

In the example of FIG. 6, at each time slot, each transmission device 602a, 602b, 602c, 602d determines a transmission power level for serving a particular receiving device 604a, 604b, 604c, 604d. In the current disclosure, it is assumed the receiving devices 604a, 604b, 604c, 604d are scheduled to receive in all time slots. Additionally, a full buffer traffic model is assumed, such that a transmission device 602a, 602b, 602c, 602d always has traffic to be delivered to one or more of the receiving devices 604a, 604b, 604c, 604d. Thus, each transmission device 602a, 602b, 602c, 602d may participate in the contention process (e.g., sensing operation). In most scenarios, a transmission device performs a sensing operation to determine an energy level of a time slot. The sensing operation may be performed during a contention window (CW).

Figure 7:
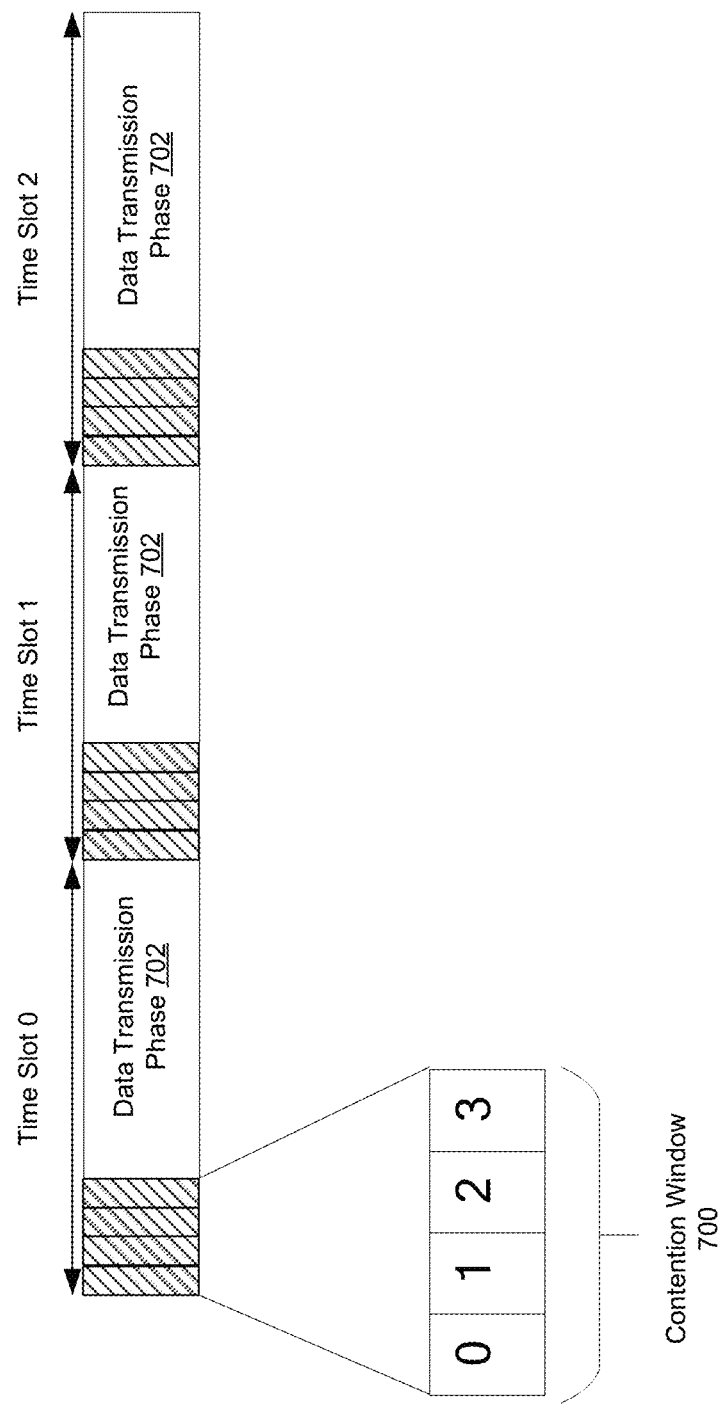
FIG. 7 is a block diagram illustrating an example of a contention window and a data transmission phase of a time slot, in accordance with aspects of the present disclosure.

FIG. 7 is a block diagram illustrating an example of a contention window 700 and a data transmission phase 702 of each time slot of a number of consecutive time slots (shown as Time Slot 0, Time Slot 1, and Time Slot 2), in accordance with aspects of the present disclosure. Before transmitting, a transmission device, such as one of the transmission devices 602a, 602b, 602c, 602d described with reference to FIG. 6, may select a countdown number at a start of the time slot based on a size of the contention window 700. In some examples, the countdown number may be randomly selected. For ease of explanation, it is assumed each transmission device selects a unique countdown number (e.g., counter) such that transmissions from two or more transmission devices do not collide in the contention process. Additionally, in the example of FIG. 7, a length of the contention window 700 may be based on a number of transmission devices. In some examples, a number of slots in the contention window 700 may be equal to the number of transmission devices. Following the example of FIG. 6, which shows four transmission devices 602a, 602b, 602c, 602d, the contention window 700 includes four counter slots (shown as 0, 1, 2, 3). In this example, the transmission device may randomly select a number between zero and three as the countdown number, where the selected countdown number corresponds to a wait time before the transmission to a receiving device, such as a UE, a base station, or another type of receiving device. Each counter number within the contention window corresponds to a different transmission time. The countdown number selected by each transmission device may be decremented after each transmission decision at a current counter number, beginning with counter number zero.

When the selected counter expires (e.g., decremented from the countdown number to zero), the transmission device determines if the channel is clear. That is, the transmission device may perform a sensing operation to identify a specific waveform signature. Additionally, or alternatively, the transmission device performs a sensing operation to determine if a detected energy in the channel is greater than an energy threshold. For example, a Wi-Fi device may perform sensing on the channel to determine energy and detect a waveform signature. As another example, an NR-U device may perform sensing on the channel to determine the energy. The transmission may be a data transmission or a transmit initiated packet, such as a clear-to-send (CTS) packet or a clear-to-send-to-self (CTS2self) packet.

As described, at the expiration of a counter number, the transmission device corresponding to the counter number may determine whether to transmit or not to transmit. Determining whether or not to transmit may be an example of a transmission determination. If the transmission device transmits, the transmission continues through the contention window 700 and in the data transmission phase 702. The process may then repeat at a subsequent time slot. Each transmission device may be specified to maximize a long-term throughput observed by a receiving device (e.g., served device), such as a UE.

In some deployments, a transmission device i (e.g., gNB) may only be cognizant of an average rate $\overline{X}_i$ of a served receiving device. Aspects of the present disclosure are not limited to a base station as the transmission device. The transmission device may be a UE or another type of transmission device. The transmission device may not directly observe the action of all neighboring transmission devices, thus providing the transmission device with only a partial observation of the system state. Furthermore, in a fading environment, each transmission device i may not be aware of the entire N×N channel matrix. Still, each transmission device i may use a signal strength $S_i$ and interference power $I_i$ experienced by the served receiving devices in a previous data transmission. The signal strength $S_i$ and interference power $I_i$ may be fed back to the transmission device via an uplink transmission, as indicators of the magnitude of the channel coefficients. Moreover, a central controller is not specified to determine an action of each transmission device. Thus, channel access may be characterized as a decentralized partially observable Markov decision process (DEC-POMDP). For ease of explanation, transmission devices may be referred to as base stations (BSs), and receiving devices may be referred to as UEs. Still, as described, aspects of the present disclosure are not limited to the base station as the transmission device and the UE as the receiving device. The transmission device may be a UE or another type of transmission device. Additionally, the receiving device may be a base station or another type of receiving device. As an example, the transmission device may be a UE and the receiving device may be a base station or another UE.

The medium access DEC-POMDP may be defined as a 7-tuple (S, $\{A_i\}$, T, R, $\{\Omega_i\}$, O, $\gamma$), where S is a set of states (e.g., state space), such as an average rate of all receiving devices (e.g., UEs) $\overline{X}[n-1]$ and a channel matrix H[n]. $A_i$ is a set of actions for a base station i, and $A=x_i A_i$ is a set of joint actions. In one example, an action vector encodes all actions $\bar{a}$ of a time step n. T is a conditional transition property between states, where T(s, a, s')=P(s'|s, a). R is a reward function. $\Omega_i$ is a set of observations for a base station i. For example, the observations $\Omega_i$ may include an average rate of a served UE $\overline{X}_i$, a signal strength $S_i$, and an interference power $I_i$ (e.g., ($\overline{X}_i$, $S_i$, $I_i$)). For spectrum-sharing, O is a set of conditional observation probabilities, where O(s', a, o)=P(o|s', a). Finally, $\gamma$ is a discount factor.

As an example, at each time slot n, a base station i takes an action $a_i \in A_i = \{0, 1\}$ causing the current state $s \in S$ to transition to s', with the probability P(s'|s, a)=T(s, a, s'). That is, the probability P of transitioning from s to s' based on an action a, where the action is transmitting or refraining from transmitting, may be based on a transition function T. In this example, each base station performs an observation based on an observation function O(s, a, s'). The observations at each time slot n, for a base station i, may be $o_i[n]=[\overline{X}_i[n-1]$, $S_i[n-1]$, $I_i[n-1]$. A reward may be generated for each base station in a layout based on a reward function R(s, a).

As described, aspects of the present disclosure train a reward model to maximize a serving rate of each receiving device. The serving rate may be a long term average serving rate. Furthermore, the maximized serving rate may be aggregated across all transmission devices.

In one configuration, the reward model captures a proportional fair metric with an exponentially smoothed average rate. The reward model may be formulated as a maximization of a utility function U( ), which is a sum of a log of an exponentially smoothed average serving rate observed by each receiving device. Specifically, the utility function U( ) may be defined as:

$$U(\overline{X}[L]) = \Sigma_{i=0}^{N-1} \log(\overline{X}_i[L]), \quad (1)$$

where $\overline{X}_i$ refers to the exponentially smoothed average serving rate observed by a receiving device i, L is an episode length, and N is the number of transmission devices. For each base station i, $a_i \in \{0, 1\}$ denotes an action vector a of actions (e.g., transmission device actions). The action may include transmitting to a receiving device (denoted by one) or refraining from transmitting (denoted by zero). For each receiving device i, $R_i$ is an observed data rate. The exponentially smoothed average rate $\overline{X}_i$ observed by a receiving device, may be defined as:

$$\log(\overline{X}_i[L]) = \log((1 - 1/B)\overline{X}_i[L-1] + (1/B)R_i[L]) \quad (2)$$
$$= \log\left((1 - 1/B)\overline{X}_i[L-1]\left(1 + \frac{R_i[L]}{(B-1)\overline{X}_i[L-1]}\right)\right)$$

$$= \log\overline{X}_i[0] + \sum_{t=1}^{L} \log\left((1 - 1/B)\left(+\frac{R_i[t]}{(B-1)\overline{X}_i[t-1]}\right)\right).$$

In EQUATION 2, 1/B represents a smoothing coefficient, where B is greater than one and is specified to balance weights of previous and current transmission rates. The utility function U( ) of EQUATION 1 is based on a number N of transmission devices. Additionally, the utility function U( ) of EQUATION 1 may be decomposed to a function of a number of time steps L (e.g., an episode length) as well as a number N of transmission devices. The decomposed utility function U( ) may be defined as:

$$U(\overline{X}[L]) = \Sigma_{i=0}^{N-1} \log(\overline{X}_i[L]) = \Sigma_{t=1}^{L} \Sigma_{i=0}^{N-1} r_i[t] + \Sigma_{i=0}^{N-1} \log \overline{X}_i[0], \quad (3)$$

where $r_i[t]$ denotes a contribution of each receiving device, at the time step t, to the reward. The reward function for a base station i at time t may be defined as:

$$r_i[t] = \log\left((1 - 1/B)\left(1 + \frac{R_i[t]}{(B-1)\overline{X}_i[t-1]}\right)\right). \quad (4)$$

The reward function of EQUATION 4 may be independent of a length of an episode, where the episode refers to previous observations, and a length of an episode refers to a number of previous time slots. Thus, the reward function may be independent of the number of previous time slots L. For online updates (e.g., updates while the neural network is deployed), the reward for UE i at time t may be $r_{t,i}^f$, which may be based on a signal to interference plus noise ratio (SINR) and an average rate. Additionally, the reward for the receiving device i at time t may be independent of a frequency of an update f. In one configuration, the reward for the receiving device i at time t may be defined as:

$$r_i^f[t] = \log\left((1 - 1/B)\left(1 + \frac{R_i[t]}{(B-1)\overline{X}_i[t-1]}\right)\right). \quad (5)$$

The described DEC-POMDP formulation entails each base station i, in a time slot n, performing an observation $o_i[n]$, taking an action $a_i$, and receiving a common reward r after all base stations have taken an action. In some cases, when a look-before-talk (LBT) device performs clear channel assessment (CCA), a subset of the LBT devices (e.g., gNBs) in the layout may be in a transmission state (e.g., transmitting data). In one configuration, the described DEC-POMDP formulation may be improved by considering the asynchronous nature of contention-based access in spectrum sharing systems, such as spectrum sharing systems specified for load-based equipment (LBE). As described, aspects of the present disclosure may also be implemented in frame-based equipment (FBE).

In some wireless communication systems, when a transmission device performs clear channel assessment, the transmission device transmits a request to send (RTS) frame as a first step in a two-way handshake before sending data frames. The RTS frame may include the medium access control (MAC) address of the transmission device, enabling other transmission devices to listen in on the transmission to map the received signal to the corresponding transmitter. A similar approach is specified in NR LAA systems, such that the energy measured at a base station may be mapped to a respective transmitting base station.

According to aspects of the present disclosure, a single state Markov decision problem (MDP) may be divided into two states, an end-of-slot (EOS) state and a contention (CON) state. In each time slot n, a counter $\theta_i$ may be randomly generated for each base station i for an extended-clear channel assessment (E-CCA) check. When that counter expires, the base station measures the energy from each transmitting base station, denoted by the N-dimensional vector $\varepsilon_i^{\theta_i} = \{\varepsilon_{ij}^{\theta_i}\}_{j \in [N]}$, such that $\varepsilon_{ij}^{\theta_i}$ is the energy received at base station i due to an ongoing data transmission between another base station j and a UE. $\varepsilon_{ij}^{\theta_i}$ is determined as:

$$y_{ij}^{\theta_i} = \sqrt{P_i h_{ij}'} a_j 1_{\theta_j < \theta_i} + C \mathcal{N}(0, \sigma_{gNB}^2) \quad (6)$$

$$\varepsilon_{ij}^{\theta_i} = |y_{ij}^{\theta_i}|^2. \quad (7)$$

In EQUATION 6, $h_{ij}'$ is a path gain between base station i and base station j, and $y_{ij}^{\theta_i}$ is the received signal corresponding to $\varepsilon_{ij}^{\theta_i}$. In EQUATIONS 6 and 7, $\varepsilon_{ij}^{\theta_i}$ assumes base station j is placed before base station i in a contention queue, otherwise the energy measurement $\varepsilon_{ij}^{\theta_i}$ may provide noise.

Figure 8:
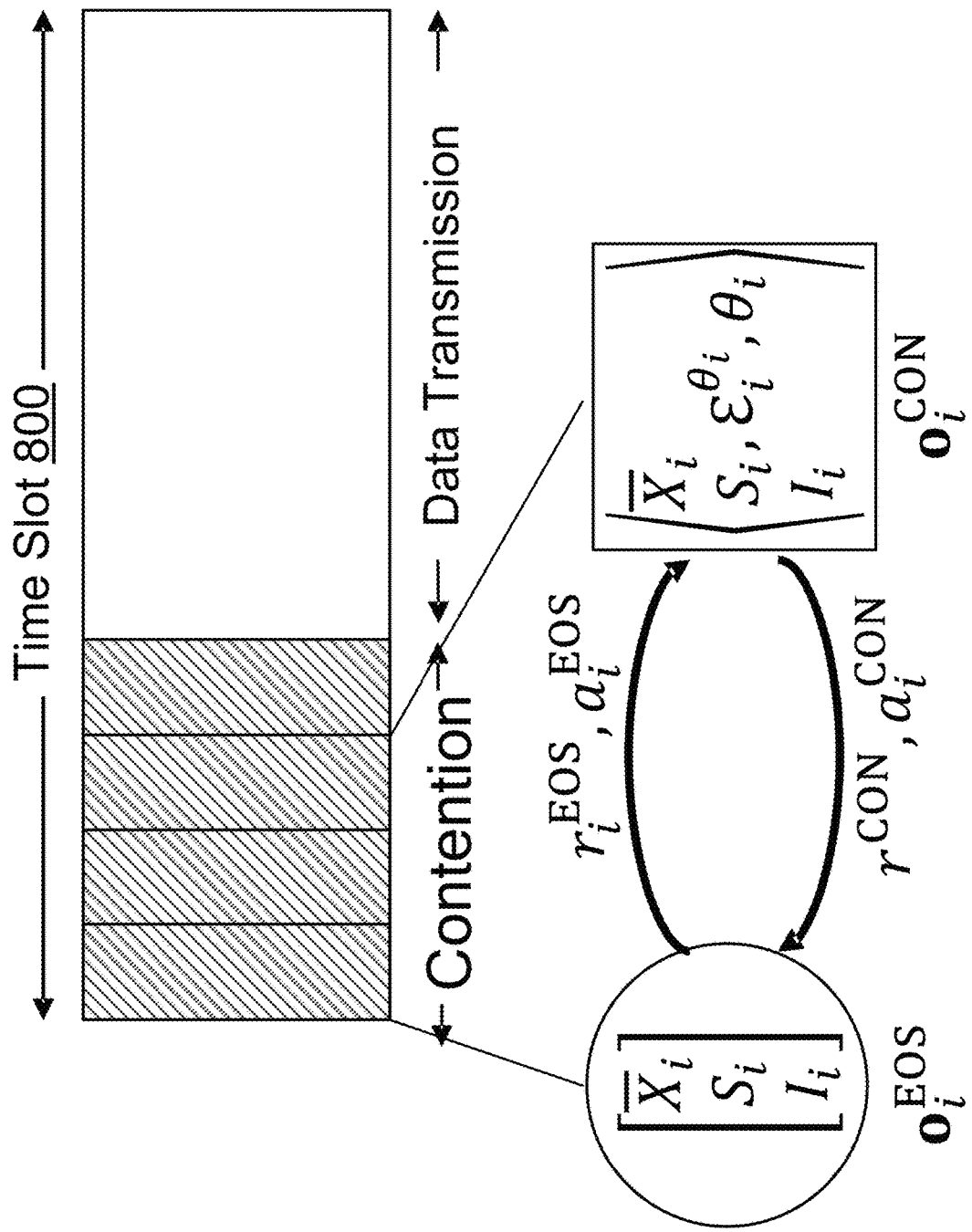
FIG. 8 is a block diagram illustrating an example of a two state Markov decision process (MDP), in accordance with aspects of the present disclosure.

FIG. 8 is a block diagram illustrating an example of a two state MDP, in accordance with aspects of the present disclosure. As shown in FIG. 8, at a start of a time slot (n) 800, a base station i may be in an end-of-slot (EOS) state. The EOS observations $o_i^{EOS}$ may include an average rate $\overline{X}_i$ of a served UE, a signal strength $S_i$, and a total interference power $I_i$ observed by the UE for a data transmission of a previous time slot (n−1). A reward $r_i^{EOS}$ and a default action $a_i^{EOS}$ for the EOS state may be set to zero because the reward $r_i^{EOS}$ and the default action $a_i^{EOS}$ correspond to a transmission within the time slot 800. The EOS observations $o_i^{EOS}$ may be limited to information for a UE served by a base station i. The average rates of other UEs may not be considered in the EOS state. The base station i may transition to a contention (CON) state when the counter $\theta_i$ expires. The CON observations $o_i^{CON}$ may include the EOS observations $o_i^{EOS}$, the N-dimensional vector of measured energies $\varepsilon_i^{\theta_i}$, and the counter $\theta_i$. Based on the CON observations $o_i^{CON}$, a trained neural network of the base station i determines a reward $r^{CON} = \sum_{i=0}^{N-1} r_i$, and an action $a_i^{CON} = \{0, 1\}$ (e.g., transmit or refrain from transmitting). The neural network may be a deep $Q$-network. In one configuration, two deep $Q$-networks are trained at each base station, an EOS network $Q^{EOS}$ and a CON network $Q^{CON}$.

Solving the medium access DEC-POMDP entails finding the optimal joint policy that maximizes a reward. A $Q$-value corresponding to an optimal policy, given a set of variables $(o_i, a_i, r, o_i')$, may be defined as:

$$Q_i^*(o_i, a_i) \approx r + \gamma \max_{a_i'} Q_i^*(o_i', a_i') \quad (8)$$

As discussed, the variable $o_i$ represents observations of a base station, the variable $a_i$ represents an action, the variable r represents a common reward. Adapting EQUATION 8 to the EOS→CON transition with $r_i^{EOS} = 0$, provides:

$$Q_i^{EOS}(o_i^{EOS}) = \gamma \max_{a_i^{CON}} Q_i^{CON}(o_i^{CON}, a_i^{CON}) \quad (9)$$

Adapting this EQUATION 9 to the CON→EOS transition with $a_i^{EOS} = 0$, provides:

$$Q_i^{CON}(o_i^{CON}, a_i^{CON}) = r^{CON} + \gamma Q_i^{EOS}(o_i^{EOS}) \quad (10)$$

Figure 9:
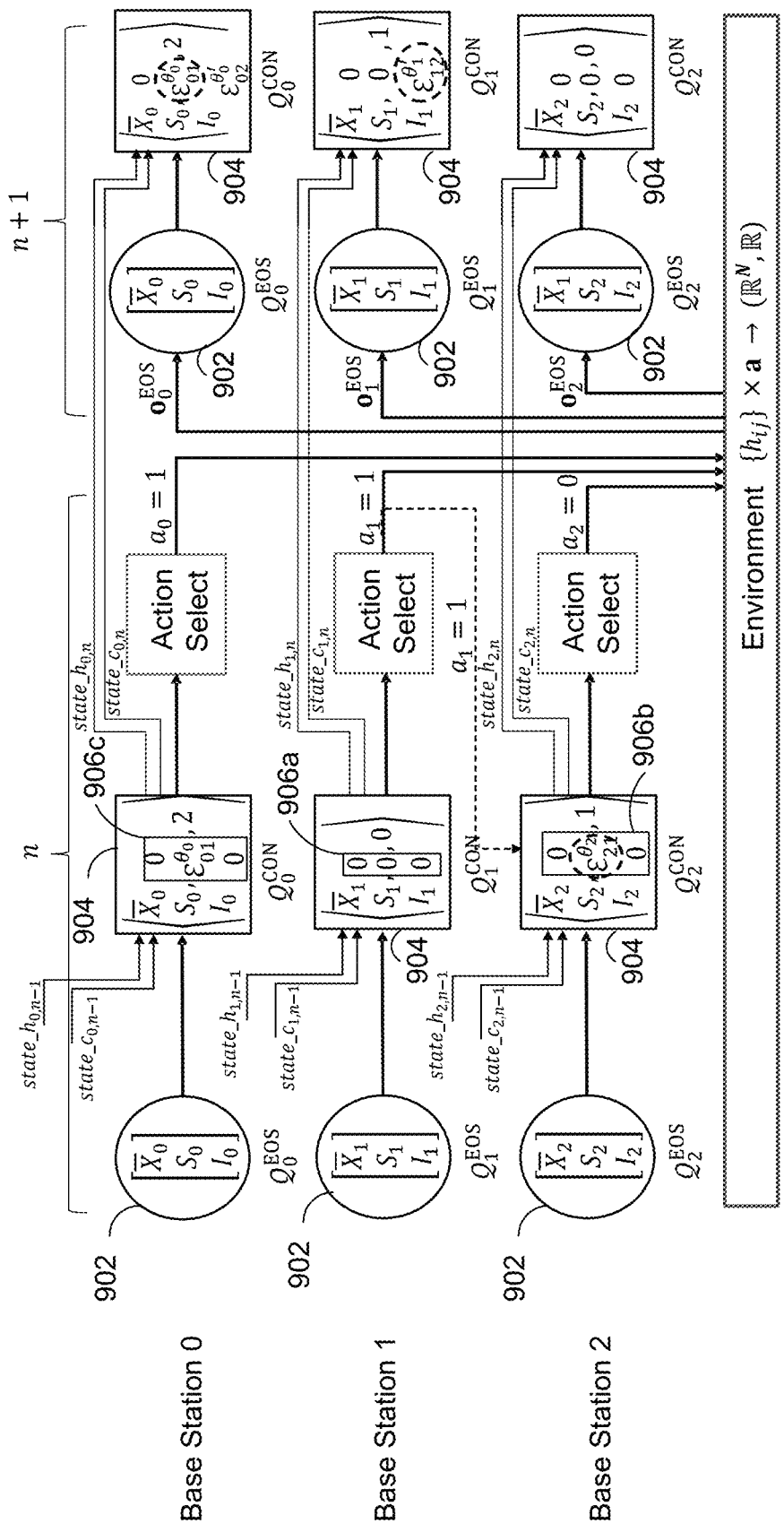
FIG. 9 is a block diagram illustrating an example of information flow between base stations, in accordance with aspects of the present disclosure.

FIG. 9 is a block diagram illustrating an example of information flow between base stations, in accordance with aspects of the present disclosure. In the example of FIG. 9, three base stations (shown as base stations 0-2) are located in the environment (e.g., layout). Each base station i includes an EOS deep $Q$-network ($Q_i^{EOS}$) 902 and a CON deep $Q$-network ($Q_i^{CON}$) 904. At a current time slot (n), a counter $\theta_i$ may be randomly selected for each base station. In this example, base station 0 selects two ($\theta_0 = 2$), base station 1 selects zero ($\theta_1 = 0$), and base station 2 selects one ($\theta_2 = 1$).

As described, at the start of the current time slot (n), each EOS deep $Q$-network 902 receives a set of EOS observations $o_i^{EOS}$ (e.g., first observations) including an average rate $\overline{X}_i$ of a served UE, a signal strength $S_i$, and a total interference power $I_i$ observed by the UE for a data transmission of a previous time slot (n−1). If the current time slot (n) is an initial time slot, such that n equals zero, each parameter of the set of EOS observations may be set to zero (e.g., $o_i^{EOS} = [\overline{X}[0], 0, 0]$). In a subsequent time slot, the set of EOS observations $o_i^{EOS}$ is determined based on the previous time slot. That is, in FIG. 9, the set of EOS observations $o_i^{EOS}$ for a subsequent time slot (n−1) are based on values of the current time slot (n).

In one configuration, each CON deep $Q$-network 904 outputs two $Q$-values corresponding to the set of actions (e.g., refrain from transmitting (0) and transmit (1)). In the example of FIG. 9, because base station 1 has the lowest counter value (e.g., ($\theta_1 = 0$)), base station 1 is the first base station to perform an energy measurement $\theta_1^{\theta_1}$ at the current time slot (n). In this example, because base station 1 is the first base station to perform the energy measurement, base station 1 does not sense transmissions from the other base stations. That is, the energy received at base station 1 due to ongoing transmissions between base station 0 and a UE 0 may be zero. Additionally, the energy received at base station 1 due to ongoing transmissions between base station 2 and a UE 2 may be zero. In the current example, a noise term is ignored for ease of explanation. As shown in FIG. 9, values 906a for an energy measurement $\varepsilon_1^{\theta_1}$ are zero (e.g., $\varepsilon_1^{\theta_1} = [0, 0, 0]$). In the example of FIG. 9, based on the energy measurement $\varepsilon_1^{\theta_1}$, the set of EOS observations $o_1^{EOS}$, and the counter $\theta_1$, the CON deep $Q$-network 904 of base station 1 determines an action $a_1[n]$ for the current time slot (n) based on the determined policy (e.g., reward function). In this example, base station 1 transmits (e.g., action 1).

As described, in the example of FIG. 9, base station 2 is scheduled after base station 1. Base station 2 senses the data transmission of base station 1, therefore, the energy received at base station 2 due to ongoing transmissions between base station 1 and a UE 1 (e.g., $\varepsilon_{21}^{\theta_2}$) may be a non-zero value. Additionally, because base station 0 is not transmitting, the energy received at base station 1 due to transmissions between base station 0 and a UE 0 may be zero. Therefore, values 906b for an energy measurement $\varepsilon_2^{\theta_2}$ may be $[0, \varepsilon_{21}^{\theta_2}, 0]$, where $\varepsilon_{21}^{\theta_2}$ is a non-zero value. Based on the energy measurement $\varepsilon_2^{\theta_2}$, the set of EOS observations $o_i^{EOS}$, and the counter $\theta_2$, the CON deep $Q$ Q-network 904 of base station 2 determines an action $a_2[n]$ for the current time slot (n) based on the determined policy (e.g., reward function). In this example, base station 2 refrains from transmitting (e.g., action 0).

Additionally, as described, in the example of FIG. 9, base station 0 is scheduled after base station 2. Base station 0 senses the ongoing data transmission of base station 1, therefore, the energy received at base station 0 due to ongoing transmissions between base station 1 and a UE 1 (e.g., $\varepsilon_{01}^{\theta_0}$) may be a non-zero value. Additionally, because base station 1 is not transmitting, the energy received at base station 0 due to transmissions between base station 1 and a UE 1 may be zero. Therefore, values 906c for an energy measurement $\varepsilon_0^{\theta_0}$ may be $[0, \varepsilon_{01}^{\theta_0}, 0]$, where $\varepsilon_{01}^{\theta_0}$ is a non-zero value. Based on the energy measurement $\varepsilon_0^{\theta_0}$, the set of EOS observations $o_i^{EOS}$, and the counter $\theta_0$, the CON deep $Q$-network 904 of base station 0 determines an action $a_0[n]$ for the current time slot (n) based on the determined policy (e.g., reward function). In this example, base station 0 transmits (e.g., action 1).

According to aspects of the present disclosure, a base station i may use both the EOS deep $Q$-network 902 and the CON deep $Q$-network 904 during training. During testing, the base station i may use the CON deep $Q$-network 904.

In the example of FIG. 9, after each base station has taken an action $a_i[n]$ at time slot (n), a reward $r[n] \in \mathbb{R}$ and an average rate $\bar{X}[n] \in \mathbb{R}^N$ may be updated based on an action vector a and a channel gain $h_{ij}$ (e.g., environment $\{h_{ij}\} \times a \to (\mathbb{R}, \mathbb{R}^N)$). The updated $r[n] \in \mathbb{R}$ and an average rate $\bar{X}[n] \in \mathbb{R}^N$ may determine observations for a subsequent time slot (n+1). A new counter may be selected by each base station i at the subsequent time slot (n+1), and the process described for the current time slot (n) may be repeated.

Additionally, as shown in FIG. 9, each CON deep $Q$-network 904 receives a hidden state $h_{i,n-1}$ and cell state $c_{i,n-1}$ generated by a respective CON deep $Q$-network 904 at a previous time slot (n−1). The hidden state $h_{i,n}$ and cell state $c_{i,n}$ may be generated by a long-short term memory (LSTM) module (not shown in FIG. 9) of the CON deep $Q$-network 904. Furthermore, the hidden state $h_{i,n}$ and cell state $c_{i,n}$ of the current time slot (n) may be output to the subsequent time slot (n+1). The hidden state $h_{i,n}$ and cell state $c_{i,n}$ are compressed representations of a local observation history of a respective CON deep $Q$-network 904, such that a policy learned by the reward model may be a mapping of a local observation history to an action space.

According to aspects of the present disclosure, the CON deep $Q$-network and the EOS deep $Q$-network may be cooperatively trained. In one configuration, replay memories $D_{EOS}$ and $D_{CON}$ may be initialized, each having a capacity of $L_D$ episodes for each base station. The CON deep $Q$-network and the EOS deep $Q$-network may be initialized with random weights. For each training iteration, an episode of length L may be generated for each base station. The episode includes parameters, such as observations $o_i^{EOS}$ and $o_i^{CON}$, actions $a_i^{CON}$, and rewards $r_i^{CON}$ for time slots zero to L. The parameters of each episode may be split into an EOS episode $E_{EOS}$ and a CON episode $E_{CON}$. The EOS episode $E_{EOS}$ may be appended to the EOS replay memory $D_{EOS}$ and the CON episode $E_{CON}$ may be appended to the CON replay memory $D_{CON}$. A batch of episodes ($B_{EOS}$ and $B_{CON}$) may be randomly sampled from both memories ($D_{EOS}$ and $D_{CON}$). Starting from a random point in each episode, from the batch of episodes, consecutive transitions of a specified sequence length may be used for training. For example, a sequence length may equal fifty transitions (e.g., fifty time slots). The weights of the CON deep $Q$-network and the EOS deep $Q$-network may be updated based on the sequences of each batch of episodes ($B_{EOS}$ and $B_{CON}$).

The training may be performed offline given path gains $\{h_{ij}\}$ between a base station and a UE, and also between base stations. The distribution of the reward $r^{CON}$ among all base stations may be limited to a training stage. Network sniffing is specified to determine an energy measurement $\varepsilon_i^{\theta_i}$, and network sniffing may not be performed during offline training. Therefore, a direct message exchange between base stations may be specified for offline training. Further, once deployed, the CON deep $Q$-network and the EOS deep $Q$-network may be refined online via online updates. That is, because the per-timestep reward is independent of the episode length and frequency of update, the CON deep $Q$-network and the EOS deep $Q$-network may be refined online.

In one configuration, the EOS state is eliminated and the process is modeled as a transition between CON states. The $Q$ function may be defined as:

$$Q_i^{CON}(o_i^{CON}, a_i^{CON}) = r^{CON} + \gamma Q_i^{EOS}(o_i^{EOS}) \qquad (11)$$

For a one stage training procedure, one replay memory may be initialized for the CON state. An episode may be stored in the replay memory and the transition occurs from one contention state to another. The remaining training procedure may be similar to a two-stage training procedure.

Figure 10:
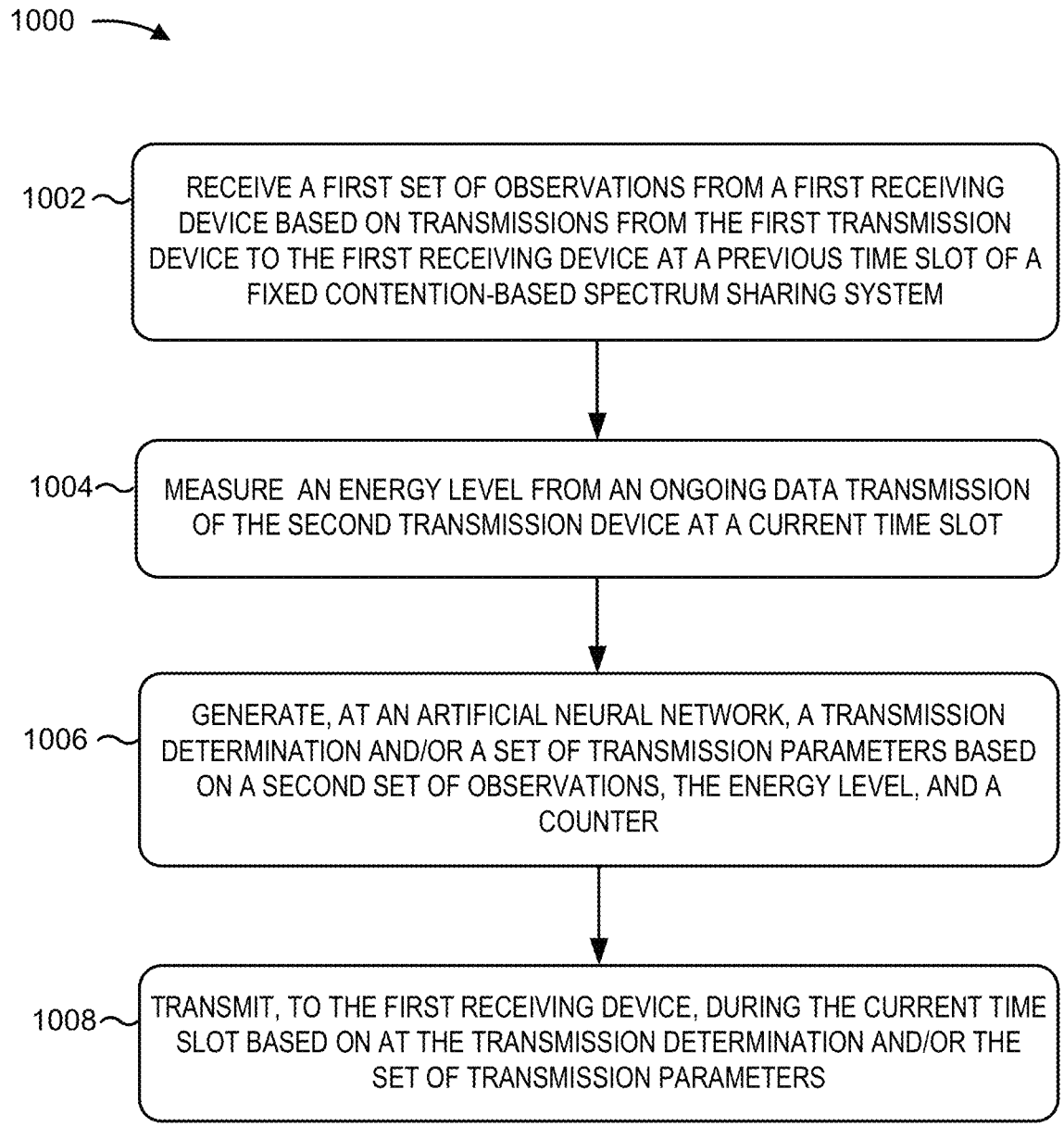
FIG. 10 is a flow diagram illustrating an example process performed, for example, by a transmission device, in accordance with various aspects of the present disclosure.

FIG. 10 is a flow diagram illustrating an example process 1000 performed, for example, by a transmission device, in accordance with various aspects of the present disclosure. The example process 1000 is an example of multi-stage Markov decision process (MDP) model for a spectrum sharing system.

As shown in FIG. 10, in some aspects, the process 1000 may begin at block 1002 by receiving a first set of observations from a first receiving device based on transmissions from the first transmission device to the first receiving device at a previous time slot of a fixed contention-based spectrum sharing system. The first transmission device may share a spectrum with a second transmission device. For example, the first transmission device (e.g., using the antenna 252, DEMOD/MOD 254, MIMO detector 256, receive processor 258, controller/processor 280, and/or memory 282) can receive a first set of observations, such as the EOS observations $o_i^{EOS}$ described with respect to FIGS. 8-9, from a first receiving device. The first receiving device may be a UE or a base station. As described above, the first set of observations may include, for example, an average rate $\bar{X}_i$ of a served UE, a signal strength $S_i$, and a total interference power $I_i$ observed by the first receiving device for a data transmission of a previous time slot (n−1).

At block 1004, process 1000 may measuring an energy level from an ongoing data transmission of the second transmission device at a current time slot (block 1004). For example, the first transmission device (e.g., using the antenna 252, DEMOD/MOD 254, MIMO detector 256, receive processor 258, controller/processor 280, and/or memory 282) can measure an energy level, such as an energy $\varepsilon_i^{\theta_i}$ as described with reference to FIGS. 8-9, from an ongoing data transmission of the second transmission device at a current time slot. As described, in one configuration, the first transmission device measures the energy from each transmission device, denoted by the N-dimensional vector $\varepsilon_i^{\theta_i} = \{\varepsilon_{ij}^{\theta_i}\}_{j \in [N]}$, such that $\varepsilon_{ij}^{\theta_i}$ is the energy received at first transmission device i due to an ongoing data transmission between another transmission device j and a receiving device.

As shown in FIG. 10, in some aspects, at block 1006, the process 1000 may generate, at an artificial neural network of the first transmission device, a transmission determination and/or a set of transmission parameters, based on a second set of observations, the energy level, and a counter. For example, the first transmission device (e.g., using the antenna 252, DEMOD/MOD 254, TX MIMO processor 266, transmit processor 264, controller/processor 280, and/ or memory 282) can generate, at an artificial neural network, such as a CON deep $Q$-network 904 described with reference to FIG. 9, a transmission determination and/or a set of transmission parameters. The transmission determination and/or the set of transmission parameters may be generated based on observations at a contention phase (e.g., $o_i^{CON}$). In an optional configuration, the transmission determination and/or the set of transmission parameters may be generated based on the EOS observations $o_i^{EOS}$ or a subset of such observations. In one example, the transmission determination may be an action from a set of actions $a_i^{CON}$ (e.g., refrain from transmitting (0) and transmit (1)). The set of transmission parameters may include, for example, an energy detection threshold for determining whether to transmit, a modulation and coding scheme, a transmission power, a precoding, an identity of the second transmission device, an estimated state of the second transmission device, a value associated with each potential transmission device action, a mean value of all potential transmission device actions, and/or a difference for each potential action.

At block 1008, the process 1000 may transmit, to the first receiving device, during the current time slot based the transmission determination and/or the set of transmission parameters. For example, the first transmission device (e.g., using the antenna 252, DEMOD/MOD 254, TX MIMO processor 266, transmit processor 264, controller/processor 280, and/or memory 282) can transmit, to the first receiving device, during the current time slot based on the transmission determination and/or the set of transmission parameters. The transmission may occur during a data transmission phase as described with reference to FIGS. 7-9. For example, as described in the example of FIG. 9, base station 1 performs an action in response to the action $a_1[n]$ generated by the CON deep $Q$-network 904. The transmission may be a downlink transmission, uplink transmission, or sidelink transmission based on a configuration of the first transmission device and the first receiving device.

Implementation examples are described in the following numbered clauses.

1. A method of wireless communication performed by a first transmission device, comprising: receiving a first set of observations from a first receiving device based on transmissions from the first transmission device to the first receiving device at a previous time slot of a fixed contention-based spectrum sharing system, the first transmission device sharing a spectrum with a second transmission device; measuring an energy level from an ongoing data transmission of the second transmission device at a current time slot; generating, at an artificial neural network of the first transmission device, at least one of a transmission determination, a set of transmission parameters, or a combination thereof, based on a second set of observations, the energy level, and a counter; and transmitting, to the first receiving device, during the current time slot based on at least one of the transmission determination, the set of transmission parameters, or the combination thereof
2. The method of Clause 1, in which the second set of observations comprise the first set of observations or a subset of the first set of observations.
3. The method of any one of Clauses 1-2, in which: the transmission device action comprises a determination to transmit to the first receiving device during the data transmission phase or a determination to refrain from transmitting to the first receiving device; and the set of transmission parameters comprises at least one of an energy detection threshold for determining whether to transmit, a modulation and coding scheme, a transmission power, a precoding, an identity of the second transmission device, an estimated state of the second transmission device, a value associated with each potential transmission device action, a mean value of all potential transmission device actions and a difference for each potential action.
4. The method of any one of Clauses 1-3, in which generating the transmission determination comprises maximizing a reward aggregated across the first transmission device and the second transmission device based on a reward function of the first artificial neural network.
5. The method of Clause 4, in which the reward comprises a served rate for each receiving device served by the first transmission device and the second transmission device.
6. The method of Clause 4, further comprising training the artificial neural network to maximize the reward.
7. The method of any one of Clauses 1-6, in which the first set of observations comprises an average serving rate, a signal strength, and an interference power.
8. The method of Clause 7, further comprising initializing the average serving rate, the signal strength, and the interference power to a pre-determined value based on the previous time slot being an initial time slot of a sequence of time slots.
9. The method of any one of Clauses 1-8, in which the energy level is zero when the first transmission device is scheduled to transmit before the second transmission device.
10. The method of any one of Clauses 1-9, further comprising randomly drawing the counter at the current time slot, the counter determining a first transmission order of the first transmission device in relation to a second transmission order of the second transmission device.
11. The method of any one of Clauses 1-10, in which the first transmission device is a base station and the first receiving device is a user equipment (UE).
12. The method of any one of Clauses 1-10, in which the first transmission device is a user equipment (UE) and the first receiving device is a base station.
13. The method of any one of Clauses 1-12, further comprising determining a set of serving parameters for a subsequent time slot based on the transmission at the current time slot.
14. A first transmission device comprising a processor, memory coupled with the processor, and instructions stored in the memory and operable, when executed by the processor to cause the first transmission device to perform any one of Clauses 1 through 13.
15. An apparatus configured for wireless communications comprising at least one means for performing any one of Clauses 1 through 13.
16. A computer program comprising code for causing an apparatus to perform any one of Clauses 1 through 13.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed by a first transmission device, comprising:
   receiving a first set of observations from a first receiving device based on transmissions from the first transmission device to the first receiving device at a previous time slot of a fixed contention-based spectrum sharing system, the first transmission device sharing a spectrum with a second transmission device;
   measuring an energy level from an ongoing data transmission of the second transmission device at a current time slot;
   generating, at an artificial neural network of the first transmission device, at least one of a transmission determination, a set of transmission parameters, or a combination thereof, based on a second set of observations, the energy level, and a counter; and
   transmitting, to the first receiving device, during the current time slot based on at least one of the transmission determination, the set of transmission parameters, or the combination thereof.

2. The method of claim 1, in which the second set of observations comprise the first set of observations or a subset of the first set of observations.

3. The method of claim 1, in which:
   the transmission device action comprises a determination to transmit to the first receiving device during the data transmission phase or a determination to refrain from transmitting to the first receiving device; and
   the set of transmission parameters comprises at least one of an energy detection threshold for determining whether to transmit, a modulation and coding scheme, a transmission power, a precoding, an identity of the second transmission device, an estimated state of the second transmission device, a value associated with each potential transmission device action, a mean value of all potential transmission device actions and a difference for each potential action.

4. The method of claim 1, in which generating the transmission determination comprises maximizing a reward aggregated across the first transmission device and the second transmission device based on a reward function of the first artificial neural network.

5. The method of claim 4, in which the reward comprises a served rate for each receiving device served by the first transmission device and the second transmission device.

6. The method of claim 4, further comprising training the artificial neural network to maximize the reward.

7. The method of claim 1, in which the first set of observations comprises an average serving rate, a signal strength, and an interference power.

8. The method of claim 7, further comprising initializing the average serving rate, the signal strength, and the interference power to a pre-determined value based on the previous time slot being an initial time slot of a sequence of time slots.

9. The method of claim 1, in which the energy level is zero when the first transmission device is scheduled to transmit before the second transmission device.

10. The method of claim 1, further comprising randomly drawing the counter at the current time slot, the counter determining a first transmission order of the first transmission device in relation to a second transmission order of the second transmission device.

11. The method of claim 1, in which the first transmission device is a base station and the first receiving device is a user equipment (UE).

12. The method of claim 1, in which the first transmission device is a user equipment (UE) and the first receiving device is a base station.

13. The method of claim 1, further comprising determining a set of serving parameters for a subsequent time slot based on the transmission at the current time slot.

14. A first transmission device for wireless communication, comprising:
   at least one processor;
   memory coupled with the at least one processor; and
   instructions stored in the memory and operable, when executed by the at least one processor, to cause the first transmission device:
   to receive a first set of observations from a first receiving device based on transmissions from the first transmission device to the first receiving device at a previous time slot of a fixed contention-based spectrum sharing system, the first transmission device sharing a spectrum with a second transmission device;

to measure an energy level from an ongoing data transmission of the second transmission device at a current time slot;

to generate, at an artificial neural network, at least one of a transmission determination, a set of transmission parameters, or a combination thereof, based on a second set of observations, the energy level, and a counter; and to transmit, to the first receiving device, during the current time slot based on at least one of the transmission determination, the set of transmission parameters, or the combination thereof.

15. The first transmission device of claim 14, in which the second set of observations comprise the first set of observations or a subset of the first set of observations.

16. The first transmission device of claim 14, in which:
the transmission device action comprises a determination to transmit to the first receiving device during the data transmission phase or a determination to refrain from transmitting to the first receiving device; and
the set of transmission parameters comprises at least one of an energy detection threshold to determine whether to transmit, a modulation and coding scheme, a transmission power, a precoding, an identity of the second transmission device, an estimated state of the second transmission device, a value associated with each potential transmission device action, a mean value of all potential transmission device actions and a difference for each potential action.

17. The first transmission device of claim 14, in which execution of the instructions further cause the first transmission device to generate the transmission determination and maximize a reward aggregated across the first transmission device and the second transmission device based on a reward function of the first artificial neural network.

18. The first transmission device of claim 17, in which the reward comprises a served rate for each receiving device served by the first transmission device and the second transmission device.

19. The first transmission device of claim 17, in which execution of the instructions further cause the first transmission device to train the artificial neural network to maximize the reward.

20. The first transmission device of claim 14, in which the first set of observations comprises an average serving rate, a signal strength, and an interference power.

21. The first transmission device of claim 20, in which execution of the instructions further cause the first transmission device to initialize the average serving rate, the signal strength, and the interference power to a pre-determined value based on the previous time slot being an initial time slot of a sequence of time slots.

22. The first transmission device of claim 14, in which the energy level is zero when the first transmission device is scheduled to transmit before the second transmission device.

23. The first transmission device of claim 14, in which execution of the instructions further cause the first transmission device to randomly draw the counter at the current time slot, the counter to determine a first transmission order of the first transmission device in relation to a second transmission order of the second transmission device.

24. The first transmission device of claim 14, in which the first transmission device is a base station and the first receiving device is a user equipment (UE).

25. The first transmission device of claim 14, in which the first transmission device is a user equipment (UE) and the first receiving device is a base station.

26. The first transmission device of claim 14, in which execution of the instructions further cause the first transmission device to determine a set of serving parameters for a subsequent time slot based on the transmission at the current time slot.

27. An apparatus for wireless communication performed at a first transmission device, comprising:
means for receiving a first set of observations from a first receiving device based on transmissions from the first transmission device to the first receiving device at a previous time slot of a fixed contention-based spectrum sharing system, the first transmission device sharing a spectrum with a second transmission device;
means for measuring an energy level from an ongoing data transmission of the second transmission device at a current time slot;
means for generating, at an artificial neural network of the first transmission device, at least one of a transmission determination, a set of transmission parameters, or a combination thereof, based on a second set of observations, the energy level, and a counter; and
means for transmitting, to the first receiving device, during the current time slot based on at least one of the transmission determination, the set of transmission parameters, or the combination thereof.

28. The apparatus of claim 27, in which the second set of observations comprise the first set of observations or a subset of the first set of observations.

29. The apparatus of claim 27, in which:
the transmission device action comprises a determination to transmit to the first receiving device during the data transmission phase or a determination to refrain from transmitting to the first receiving device; and
the set of transmission parameters comprises at least one of an energy detection threshold for determining whether to transmit, a modulation and coding scheme, a transmission power, a precoding, an identity of the second transmission device, an estimated state of the second transmission device, a value associated with each potential transmission device action, a mean value of all potential transmission device actions and a difference for each potential action.

30. The apparatus of claim 27, in which the means for generating the transmission determination comprises means for maximizing a reward aggregated across the first transmission device and the second transmission device based on a reward function of the first artificial neural network.

31. The apparatus of claim 27, in which:
the first set of observations comprises an average serving rate, a signal strength, and an interference power; and
the apparatus further comprises means for initializing the average serving rate, the signal strength, and the interference power to a pre-determined value based on the previous time slot being an initial time slot of a sequence of time slots.

32. The apparatus of claim 27, further comprising means for randomly drawing the counter at the current time slot, the counter determining a first transmission order of the first transmission device in relation to a second transmission order of the second transmission device.

33. A non-transitory computer-readable medium having program code recorded thereon for wireless communication at a first transmission device, the program code executed by at least one processor and comprising:
program code to receive a first set of observations from a first receiving device based on transmissions from the first transmission device to the first receiving device at a previous time slot of a fixed contention-based spectrum sharing system, the first transmission device sharing a spectrum with a second transmission device;

program code to measure an energy level from an ongoing data transmission of the second transmission device at a current time slot;

program code to generate, at an artificial neural network, at least one of a transmission determination, a set of transmission parameters, or a combination thereof, based on a second set of observations, the energy level, and a counter; and program code to transmit, to the first receiving device, during the current time slot based on at least one of the transmission determination, the set of transmission parameters, or the combination thereof.

34. The non-transitory computer-readable medium of claim 33, in which the second set of observations comprise the first set of observations or a subset of the first set of observations.

35. The non-transitory computer-readable medium of claim 33, in which:
the transmission device action comprises a determination to transmit to the first receiving device during the data transmission phase or a determination to refrain from transmitting to the first receiving device; and
the set of transmission parameters comprises at least one of an energy detection threshold for determining whether to transmit, a modulation and coding scheme, a transmission power, a precoding, an identity of the second transmission device, an estimated state of the second transmission device, a value associated with each potential transmission device action, a mean value of all potential transmission device actions and a difference for each potential action.

36. The non-transitory computer-readable medium of claim 33, in which the program code further comprises program code to generate the transmission determination and maximize a reward aggregated across the first transmission device and the second transmission device based on a reward function of the first artificial neural network.

37. The non-transitory computer-readable medium of claim 33, in which:
the first set of observations comprises an average serving rate, a signal strength, and an interference power; and
the program code further comprises program code to initialize the average serving rate, the signal strength, and the interference power to a pre-determined value based on the previous time slot being an initial time slot of a sequence of time slots.

38. The non-transitory computer-readable medium of claim 33, in which the energy level is zero when the first transmission device is scheduled to transmit before the second transmission device.

39. The non-transitory computer-readable medium of claim 33, in which:
the program code further comprises program code to randomly draw the counter at the current time slot; and
the counter determines a first transmission order of the first transmission device in relation to a second transmission order of the second transmission device.

40. The non-transitory computer-readable medium of claim 33, in which the program code further comprises program code to determine a set of serving parameters for a subsequent time slot based on the transmission at the current time slot.

* * * * *